US011486404B1

(12) United States Patent
Mathis et al.

(10) Patent No.: US 11,486,404 B1
(45) Date of Patent: Nov. 1, 2022

(54) SWITCH HOUSING REMOTE CONTROL

(71) Applicant: HKC-US, LLC, Memphis, TN (US)

(72) Inventors: Kent Mathis, Germantown, TN (US); James P. Burns, Memphis, TN (US); Brendan Byrne, Germantown, TN (US)

(73) Assignee: HKC-US, LLC, Memphis, TN (US)

( * ) Notice: Subject to any disclaimer, the term of this patent is extended or adjusted under 35 U.S.C. 154(b) by 302 days.

(21) Appl. No.: 16/172,108

(22) Filed: Oct. 26, 2018

Related U.S. Application Data

(60) Provisional application No. 62/578,830, filed on Oct. 30, 2017.

(51) Int. Cl.
*H02P 23/00* (2016.01)
*F04D 25/08* (2006.01)
*G08C 17/02* (2006.01)
*H05B 47/19* (2020.01)

(52) U.S. Cl.
CPC ........... *F04D 25/088* (2013.01); *G08C 17/02* (2013.01); *H05B 47/19* (2020.01)

(58) Field of Classification Search
CPC ........ F04D 25/088; H05B 47/19; G08C 17/02
USPC ........................................................ 318/162
See application file for complete search history.

(56) References Cited

U.S. PATENT DOCUMENTS 5,559,406 A * 9/1996 Chang ............... H02J 13/00019 315/322
5,738,496 A * 4/1998 Mehta .................. F04D 25/088 340/12.22
D523,138 S * 6/2006 Burns .......................... D23/411
D524,473 S * 7/2006 Burns ............................ D26/59
8,519,649 B2 * 8/2013 Taniguchi ............... H02P 6/182 318/400.02
9,453,517 B1 9/2016 Burns et al.
2008/0143272 A1 * 6/2008 Byrne .................... H05B 39/08 315/291
2008/0266867 A1 * 10/2008 Byrne ................ F21V 33/0092 362/294
2011/0285337 A1 * 11/2011 Taniguchi ............... H02P 21/24 318/400.34
2013/0049656 A1 * 2/2013 Yasui ...................... H02P 21/00 318/400.02
2013/0106329 A1 * 5/2013 Kato ....................... H02P 21/26 318/400.11
2016/0047391 A1 * 2/2016 McPherson ........... F04D 25/088 417/423.7

* cited by examiner

*Primary Examiner* — Kawing Chan
*Assistant Examiner* — Gabriel Agared
(74) *Attorney, Agent, or Firm* — Brian S. Steinberger; Hilary F. Steinberger; Law Offices of Brian S. Steinberger, P.A.

(57) ABSTRACT

Systems, devices, and methods for providing switch housing remote controls for ceiling fans. The remote receiver in the ceiling fan housing uses existing capacitors installed in the ceiling fan and shares those capacitors with existing mechanical pull chains for the ceiling fan, which eliminates the need for separate capacitors in the remote receiver.

7 Claims, 8 Drawing Sheets

6. Thermistor 100K/25⊠+-1%
Checks the temperature of PCB and prevets over heating.

SWITCH HOUSING REMOTE CONTROL

CROSS-REFERENCE TO RELATED APPLICATIONS

This application claims the benefit of priority to U.S. Provisional Patent Application Ser. No. 62/578,830 filed Oct. 30, 2017, which is incorporated by reference in its' entirety.

FIELD OF INVENTION

This invention relates to switch housing remote controls inside of ceiling fans, and in particular to systems, devices, and methods for providing switch housing remote controls for ceiling fans, wherein the remote receiver in the ceiling fan housing uses existing capacitors installed in the ceiling fan and shares those capacitors with existing mechanical pull chains for the ceiling fan, which eliminates the need for separate capacitors in the remote receiver.

BACKGROUND AND PRIOR ART

Ceiling fans on the market now utilize a capacitor for the ceiling fan speeds and a capacitor for lights. Remote controls currently use a second set of capacitors built into the remote receiver housing inside of the ceiling fan to control the fan speeds and lights.

FIG. 1A is a prior art view of a ceiling fan control only with the pull chain connected to the capacitor and the fan motor. FIG. 1B is another prior art view of a traditional ceiling fan using a separate capacitor for the pull chain and a separate capacitor for the remote control receiver, both with the fan motor.

FIG. 2 is a prior art view of a ceiling fan 1 having a remote receiver 12 installed in the canopy 10 that is mounted to a ceiling. The typical remote receiver can have a generally rectangular box configuration of approximately 4.5 inches by approximately 2 inches by approximately 0.75 inches.

U.S. Pat. No. 5,738,496 to Mehta, which is incorporated by reference in its' entirety, shows a traditional assembly of having a second set of capacitors in the remote receiver, and where the fan's capacitors are redundant and do not work with the remote control. The remote bypasses the fan's capacitors and uses its own.

As such, the extra set of capacitors adds additional expense to the manufacture of the ceiling fans and requires additional space in the switch housing, which also requires more costs for materials to have a larger switch housing, as well as extra weight, and extra power costs.

Thus, the need exists for solutions to the above problems with the prior art.

SUMMARY OF THE INVENTION

A primary objective of the present invention is to provide systems, devices, and methods for providing switch housing remote controls for ceiling fans, wherein the remote receiver in the ceiling fan housing uses existing capacitors installed in the ceiling fan and shares those capacitors with existing mechanical pull chains for the ceiling fan, which eliminates the need for separate capacitors in the remote receiver.

A secondary objective of the present invention is to provide systems, devices, and methods for providing switch housing remote controls for ceiling fans, wherein the remote receiver in the ceiling fan housing uses existing capacitors installed in the ceiling fan and shares those capacitors with existing mechanical pull chains for the ceiling fan, which saves space that would have been needed for extra capacitors, and uses a smaller switch housing, which uses less power.

A third objective of the present invention is to provide systems, devices, and methods for providing switch housing remote controls for ceiling fans, wherein the remote receiver in the ceiling fan housing uses existing capacitors installed in the ceiling fan and shares those capacitors with existing mechanical pull chains for the ceiling fan, which is less costly for not requiring extra capacitors.

A switch housing remote control system for ceiling fans, can include a ceiling fan motor with ceiling fan blades, a first capacitor adjacent to the ceiling fan motor for controlling operating speeds for the ceiling fan motor, a first mechanical switch for turning power on and off to the first capacitor for controlling operating speeds for the ceiling fan motor, a remote control transmitter for operating the ceiling fan motor, and a switch housing receiver in the ceiling fan for receiving wireless signal transmissions from the remote control transmitter for turning power on and off to the first capacitor for controlling operating speeds for the ceiling fan motor.

The mechanical switch can include a pull chain.

The system can further include at least one light attached to the ceiling fan motor, a second capacitor adjacent to the ceiling fan motor for activating the at least one light, a second mechanical switch for turning power on and off to the second capacitor for activating the at least one light, wherein the remote control transmitter further remotely activates the at least one light by turning power on an off to the second capacitor.

The first mechanical switch and the second mechanical switch can includes pull chains.

The second capacitor can further controls dimming levels of the at least one light.

The switch housing receiver can be mounted in a switch housing on which the first mechanical switch is attached, which is located below the ceiling fan blades.

The switch housing receiver can be mounted in a switch housing on which both the first mechanical switch and the second mechanical switch is attached, which is located below the ceiling fan blades.

The switch housing receiver can have dimensions of approximately 2 inches by approximately 1.5 inches by approximately 1 inch.

Further objects and advantages of this invention will be apparent from the following detailed description of the presently preferred embodiments which are illustrated schematically in the accompanying drawings.

BRIEF DESCRIPTION OF THE FIGURES

The drawing figures depict one or more implementations in accord with the present concepts, by way of example only, not by way of limitations. In the figures, like reference numerals refer to the same or similar elements.

DESCRIPTION OF THE PREFERRED EMBODIMENTS

Before explaining the disclosed embodiments of the present invention in detail it is to be understood that the invention is not limited in its applications to the details of the particular arrangements shown since the invention is capable of other embodiments. Also, the terminology used herein is for the purpose of description and not of limitation.

In the Summary above and in the Detailed Description of Preferred Embodiments and in the accompanying drawings, reference is made to particular features (including method steps) of the invention. It is to be understood that the disclosure of the invention in this specification does not include all possible combinations of such particular features. For example, where a particular feature is disclosed in the context of a particular aspect or embodiment of the invention, that feature can also be used, to the extent possible, in combination with and/or in the context of other particular aspects and embodiments of the invention, and in the invention generally.

In this section, some embodiments of the invention will be described more fully with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will convey the scope of the invention to those skilled in the art. Like numbers refer to like elements throughout, and prime notation is used to indicate similar elements in alternative embodiments.

The novel invention removes the extra capacitor(s) generally used inside of the remote control receiver that is normally used by the remote transmitter which utilizes an extra set of capacitors, with one of the extra capacitors for the ceiling fan speeds and another one of the extra capacitors for the lights.

Figure 1A:
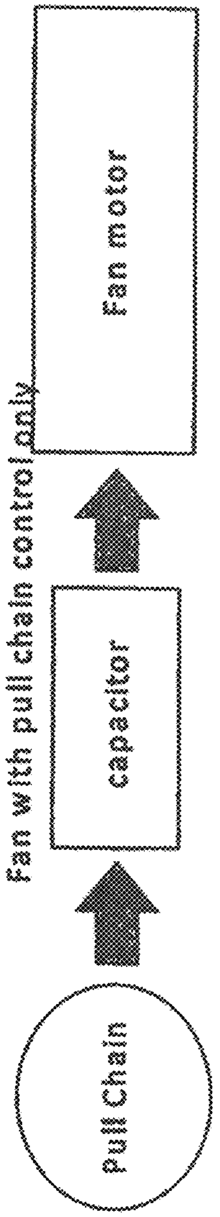
FIG. 1A (PRIOR ART)
FIG. 1A is a prior art view of a ceiling fan control only with the pull chain connected to the capacitor and the fan motor.
Figure 1B:
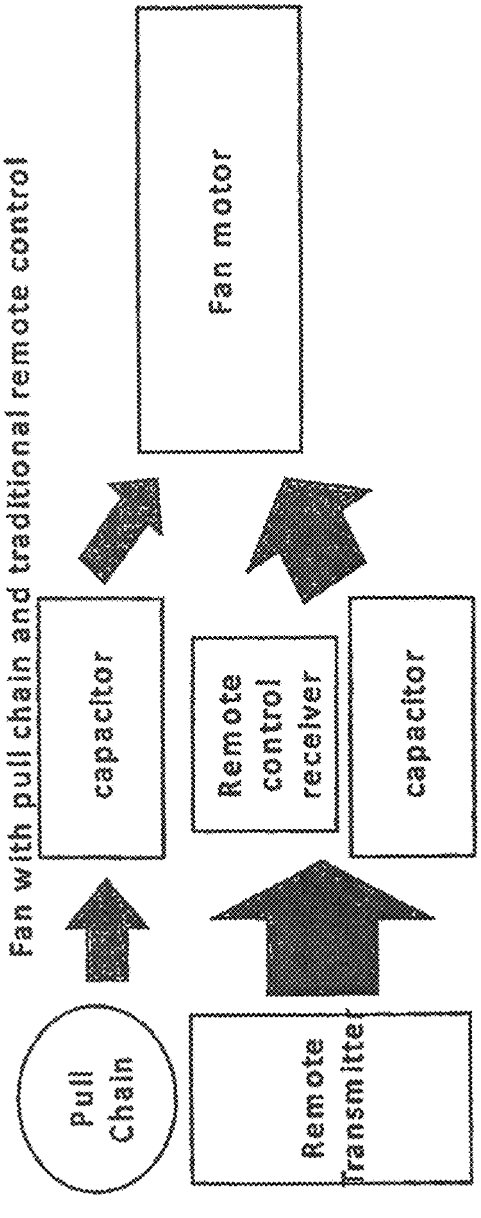
FIG. 1B (PRIOR ART)
FIG. 1B is another prior art view of a traditional ceiling fan using a separate capacitor for the pull chain and a separate capacitor for the remote control receiver, both with the fan motor.
Figure 3:
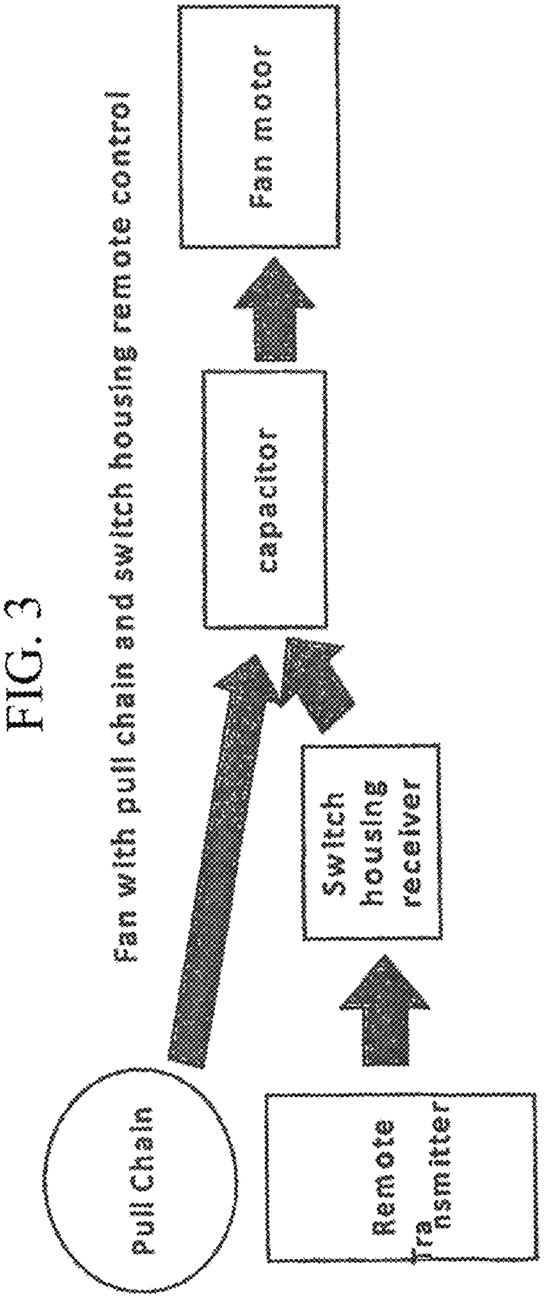
FIG. 3 is a flow chart of the novel circuit (shown more in detail in reference to FIGS. 4A-4D) which is an improvement on FIG. 1 where the pull chain and remote control and switch housing using the same capacitor(s) for controlling the fan motor.

FIG. 3 is a flow chart of the novel circuit (shown more in detail in reference to FIGS. 4A-4D) which is an improvement on FIG. 1A where the pull chain and remote control and switch housing using the same capacitor(s) for controlling the fan motor.

The exiting capacitor(s) can be a set having one capacitor for controlling the ceiling fan speed from the pull chain and another capacitor for controlling the ceiling fan light(s) when using the pull chain.

FIGS. 4A-4D shows the novel circuit inside the ceiling fan. As shown an antenna is used to communicate with the remote control transmitter. With the antenna directly connected to the existing capacitors for the switches for the fan light(s) and the fan speeds.

A list of the components in FIGS. 4A-4D will now be described

C9 capacitor #9
C10 capacitor #10
C11 capacitor #11
C13 capacitor #13
C14 capacitor #14
C16 capacitor #16
C17 capacitor #17
C18 capacitor #18
C19 capacitor #19
C21 capacitor #21
C22 capacitor #22
C23 capacitor #23
C26 capacitor #26
C28 capacitor #28
C29 capacitor #29
C35 capacitor #35
C37 capacitor #37
CX1 line filter
L10 line coil
TP1 lead to power
R1 resistor #1
R2 resistor #2
R3 resistor #3
R4 resistor #4
R6 resistor #6
R11 resistor #11
R19 resistor #19
R30 resistor #30
R31 resistor #31
R32 resistor #32
R33 resistor #33
R37 resistor #37
R38 resistor #38
U4 'U' numbers are unit (part) location markers
Q1 Inductor #1
Q2 Inductor #2
D1 diode #1
D2 diode #2
D3 diode #3
D4 diode #4
D5 diode #5
D10 diode #10
D11 diode #11
L1 line coil
NR1 variable resistor
TNR1 terminal #1
TNR2 terminal #2
TRIAC1 Triac switch #1
TRIAC2 Triac switch #2
TRIAC3 Triac switch #3

Figure 4A:
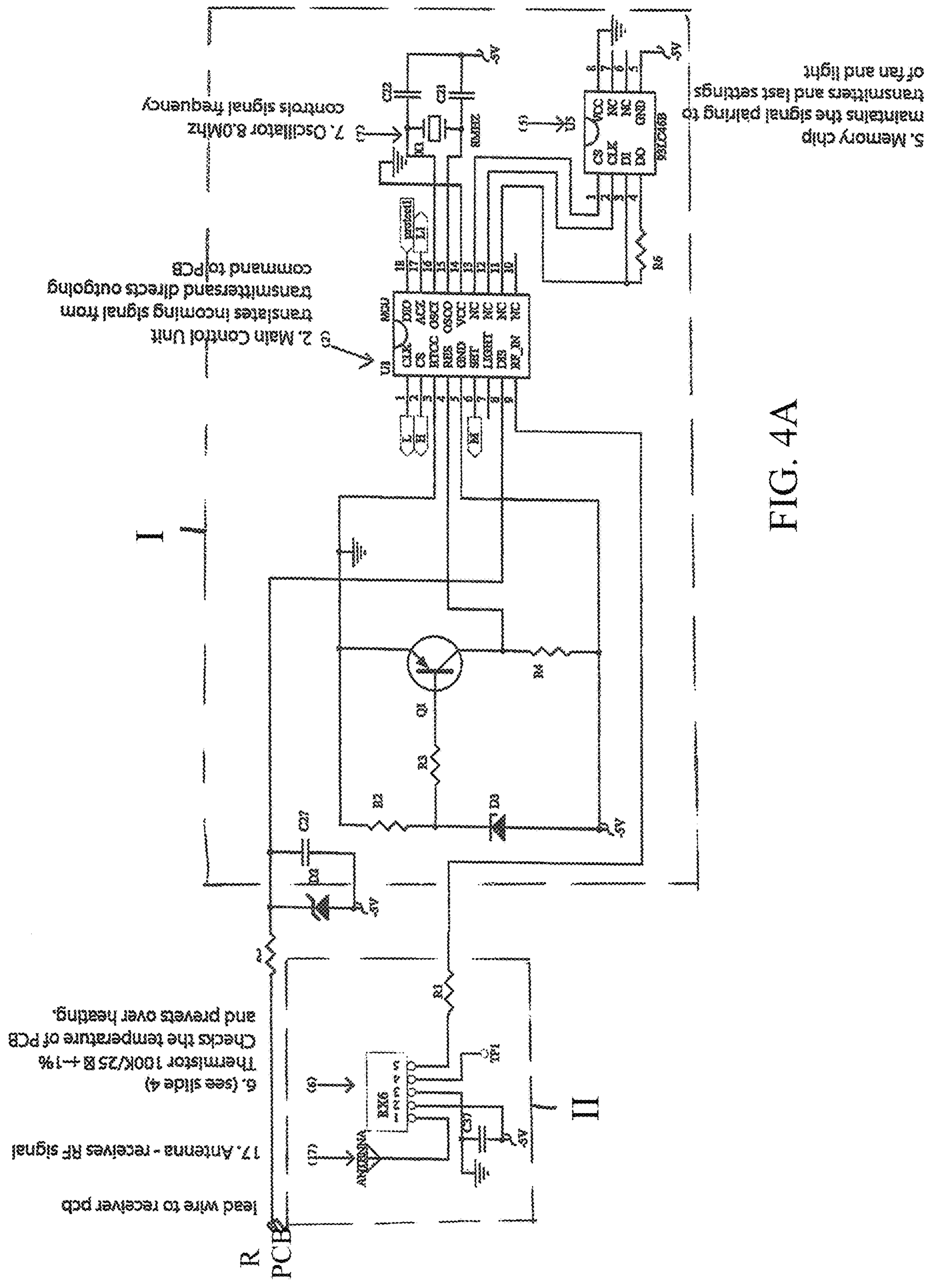
FIG. 4A shows the novel part of the circuit inside the ceiling fan which controls fan speeds and the circuit part having the antenna to communicate with the transmitter.

FIG. 4A shows the novel part I of the circuit inside the ceiling fan which controls fan speeds and the circuit part II having the antenna to communicate with the transmitter.

Component (2) is the main control unit which translates incoming signals from the transmitters and directs outgoing commands to the PCB (printed circuit board).

Component (5) is a memory chip that maintains the signal pairing to transmitters and last settings of the fan and the light.

Component (6) refers to the Thermistor 100K/25+−1%, which checks the temperature of the PCB (printed circuit board) and prevents overheating.

Component (7) refers to the oscillator 8.0 Mhz which controls signal frequency.

Component (17) refers to the antenna which receives the RF (radio frequency) signal from the remote.

Figure 4B:
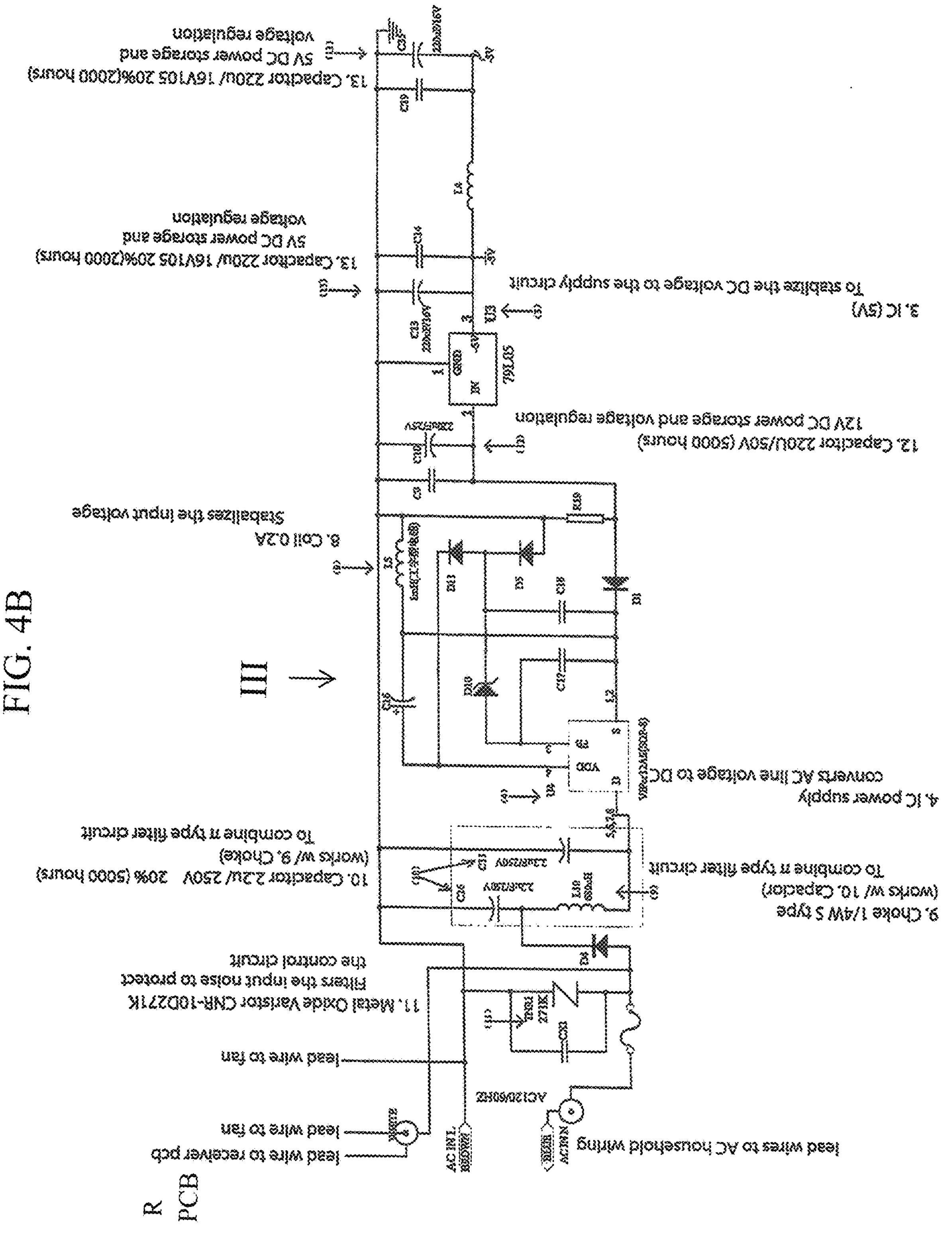
FIG. 4B shows the novel part of the circuit inside the ceiling fan that is used to control light on/off and dimming.

FIG. 4B shows the novel part III of the circuit inside the ceiling fan that is used to control light on/off and dimming. This circuit stabilizes the voltage input and output to the circuit. The stabilization helps protect the circuit from voltage spikes and drops.

Component (3) refers to IC (5V) which is for stabilizing the DC (direct current) voltage supply to the supply circuit.

Component (4) refers to the IC power supply which converts AC (alternating current) line voltage to DC (direct current).

Component (8) refers to coil 0.2 which stabilizes the input voltage.

Component (9) refers the choke ¼ S type which works with the component (10) capacitor to combine n type filter circuit.

Component (10) refers to a capacitor 2.2 u/250V, 20% (5000 hours) with works with component (9) the choke to combine Π type filter circuit.

Component (11) refers to the metal oxide varistor CNR-10D271K which filters the input noise to protect the control circuit.

Component (12) refers to capacitor 220 U/50V (5000 hours) 12V DC power storage and voltage regulation.

Component (13) (listed twice) refers to the capacitor 220 u/16V105 20% (2000 hours) 5V DC power storage and voltage regulation.

Figure 4C:
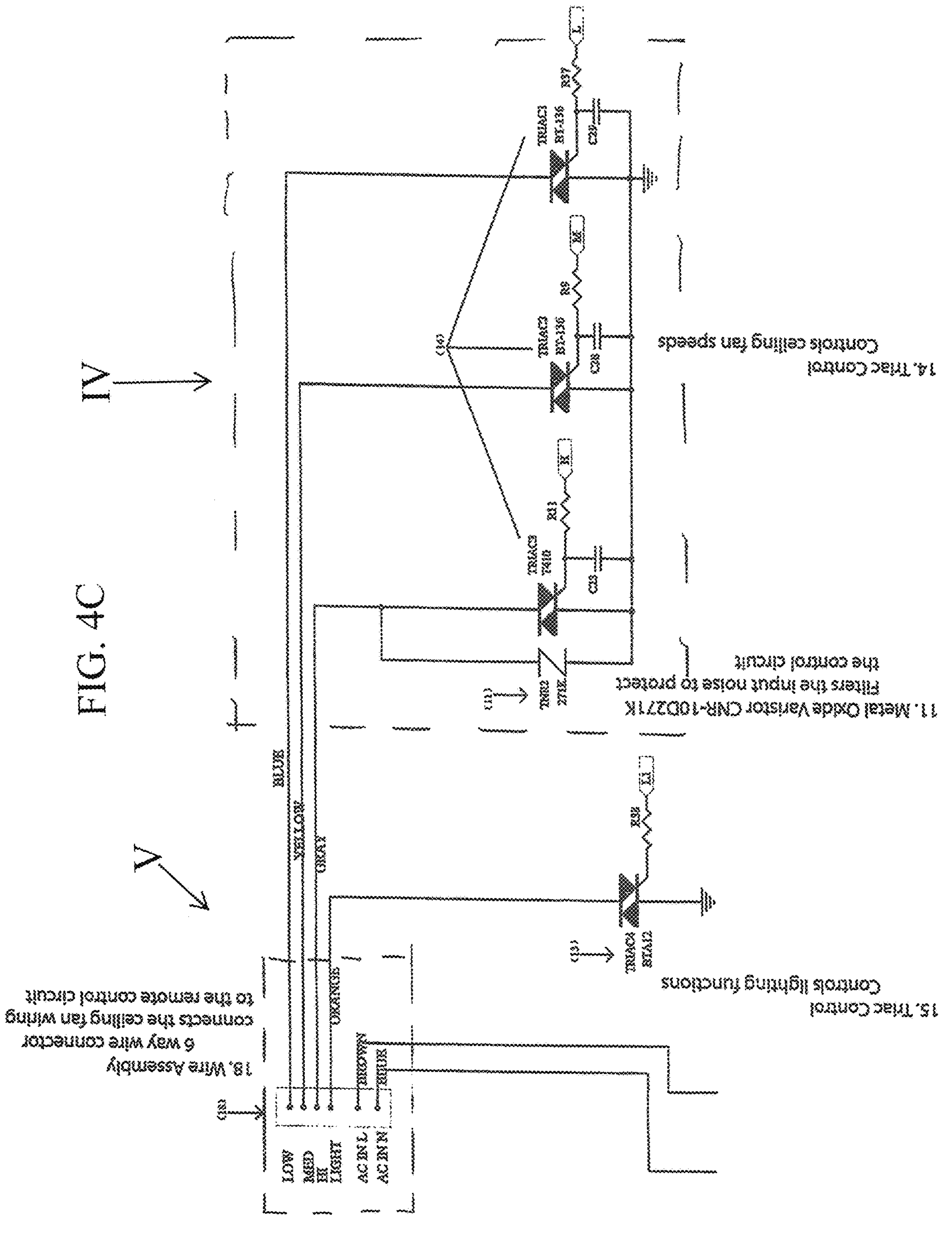
FIG. 4C shows the novel part of the circuit inside the ceiling fan with switches for light and fan speeds, and the novel part of the circuit with the connector from receiver to fan capacitors.

FIG. 4C shows the novel part IV of the circuit inside the ceiling fan with switches for light and fan speeds, and the novel part V of the circuit with the connector from receiver to fan capacitors.

Component (11) refers to the metal oxide varistor CNR-10D271K which filters the input noise to protect the control circuit.

Component 14 refers to the triac control which controls ceiling fan speeds.

Component 15 refers to the triac control which controls lighting dimming and on/off features.

Component 18 refers to the wire assembly with 6 way wire connector that connects the ceiling fan wiring to the remote control circuit and household wiring.

Figure 4D:
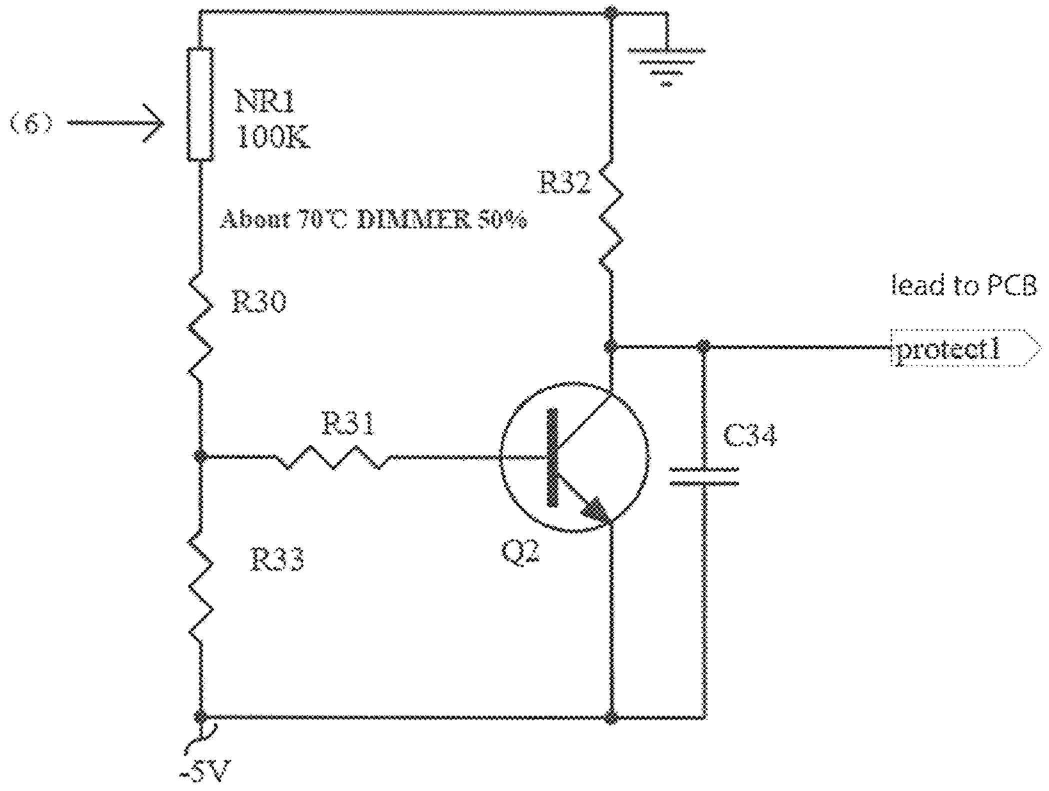
FIG. 4D shows the heat sink part of the circuit inside the ceiling fan.

FIG. 4D shows the heat sink part of the circuit inside the ceiling fan.

Component (6) refers to a thermistor 100K/25+−1%, which checks the temperature of the PCB (printed circuit board) and prevents over heating. FIG. 4D is a detail from FIG. 4A. Component 6—heat sink is in FIG. 4A. it protects the Main Control Unit and Memory from overheating.

Figure 2:
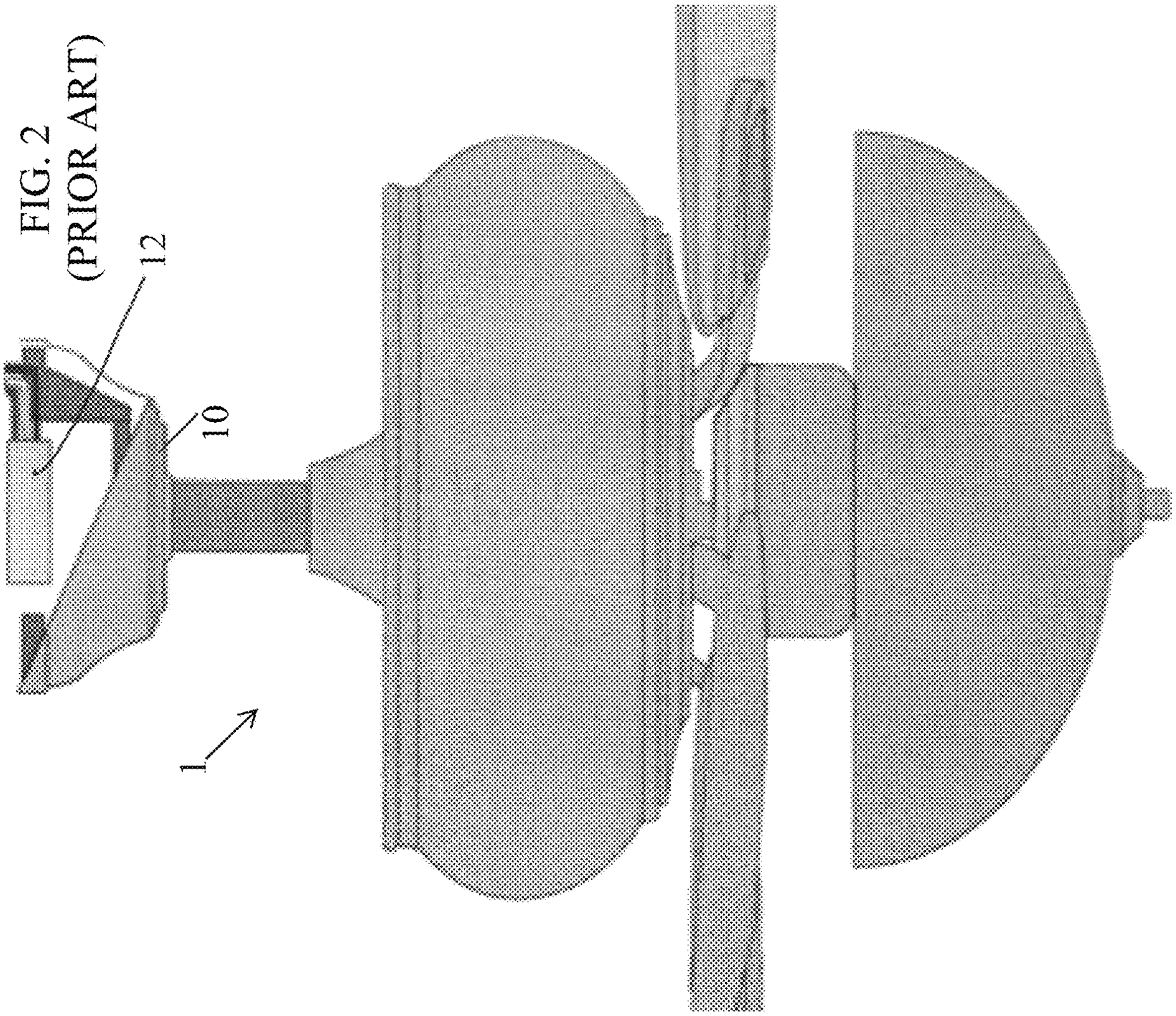
FIG. 2 (PRIOR ART)
FIG. 2 is a prior art view of a ceiling fan 1 having a remote receiver 12 installed in the canopy 10 that is mounted to a ceiling.

Unlike the prior art shown in FIG. 2, changing the location of the remote receiver from the canopy to the switch box housing, makes for adding or replacing the remote receiver easier for the consumer, since it is much lower to the ground.

Figure 5:
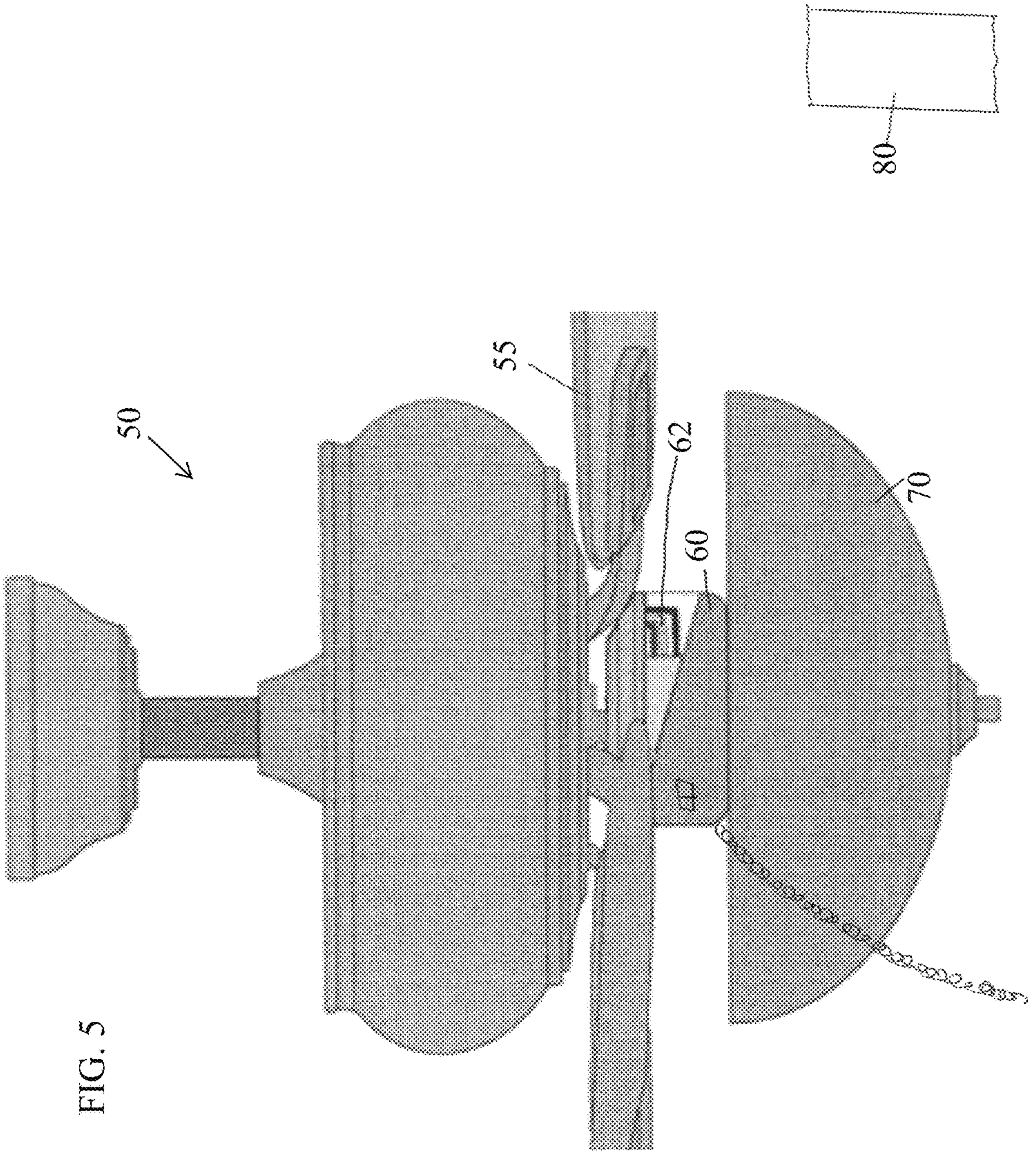
FIG. 5 shows a ceiling fan motor housing, with fan blades, and light kit with remote receiver in the switch housing below the fan blades that can incorporate the novel circuitry of FIGS. 4A-4D.

FIG. 5 shows a ceiling fan 50 with fan blades 55, and light kit 70 with the remote receiver 62 in the switch housing 60 below the fan blades that can incorporate the novel circuitry of FIGS. 4A-4D. The switch housing 60 has exterior mechanical switches for turning the fan on and off, as well as includes a pull chain attached thereto for also turning the fan on and off.

The remote receiver 62 can be located below the fan blades 55 and be close to the light kit 70. The remote receiver 62 can be sized substantially smaller than the prior art remote receiver 12 shown in FIG. 3. The novel remote receiver 62 can have a smaller rectangular box shape of approximately 2 inches by approximately 1.5 inches by approximately 1 inch. As such, the novel remote receiver 62 shown in FIG. 5 can take up substantially less space since it is at least less than approximately half in size than the prior art remote receiver 12 of FIG. 3.

A remote transmitter 80 can control turning on and off the fan blades remotely, as well as speed of the rotating fans, as well as remotely turning the lights 70 on and off, as well as providing dimming controls for the lights 70.

The fan 50 with remote receiver and remote transmitter 80 and other components similar to those described in U.S. Pat. No. 5,738,496 to Mehta, which is incorporated by reference in its' entirety.

By using the existing capacitor(s) in the motor housing, this eliminates the need for separate capacitors in the switch housing for the remote receiver.

By using the existing capacitor(s) in the motor housing, this saves space that would have been needed for extra capacitors, and uses a smaller switch housing, which uses less power.

By using existing capacitors installed in the ceiling fan and shares those capacitors with existing mechanical pull chains for the ceiling fan, the result is less costly for not requiring extra capacitors.

The circuit parts in FIGS. 4A and 4B can be located inside the remote receiver 62 which would be installed inside the switch housing 60 shown in FIG. 5. The remote receiver 62 shares the same location as the capacitors that are native to the fan. This allows the remote receiver 62 to utilize the same capacitors by wiring directly into the fan's internal wiring system.

The term "approximately" is similar to the term "about" and can be +/−10% of the amount referenced. Additionally, preferred amounts and ranges can include the amounts and ranges referenced without the prefix of being approximately.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

We claim:

1. A switch housing remote control system for ceiling fans, comprising:

a ceiling fan motor with ceiling fan blades and a receiver;

an existing first capacitor integrated with the ceiling fan motor and the receiver for controlling operating speeds for the ceiling fan motor;

a first mechanical switch for turning power on and off to the existing first capacitor for controlling operating speeds for the ceiling fan motor;

at least one light attached to the ceiling fan motor;

an existing second capacitor integrated with the at least one light for activating the at least one light;

a second mechanical switch for turning power on and off to the existing second capacitor;

a remote control transmitter for remotely turning power on and off to the first mechanical switch operating the ceiling fan motor;

a remote switch housing receiver which houses the receiver in the ceiling fan for receiving wireless signal transmissions from the remote control transmitter for turning power on and off to the existing first capacitor for controlling operating speeds for the ceiling fan motor, and for turning power on and off to the existing second capacitor for activating the at least one light, wherein the remote switch housing receiver solely uses the existing first capacitor and the existing second capacitor without using any additional capacitors, and wherein the remote control transmitter further remotely activates the at least one light by turning power on an off to the existing second capacitor;

the remote switch housing receiver is mounted in a fan switch box housing on which both the first mechanical switch and the second mechanical switch is attached, which is located below the ceiling fan blades, wherein the remote switch housing receiver is a replaceable rectangular box size of approximately 2 inches by approximately 1.5 inches by approximately 1 inch; and a circuit inside the ceiling fan which controls fan speeds, and an antenna to communicate with the transmitter, and wherein a control unit translates incoming signals from the transmitter and directs outgoing commands to a printed circuit board, and a memory chip that maintains signal pairing to the transmitter and last settings of the fan and the light.

2. The system of claim 1, wherein the first mechanical switch includes: a pull chain.

3. The system of claim 1, wherein the first mechanical switch and the second mechanical switch includes pull chains.

4. The system of claim 1, wherein the existing second capacitor further controls dimming levels of the at least one light.

5. The system of claim 1, wherein the remote switch housing receiver is mounted in a switch housing on which the first mechanical switch is attached, which is located below the ceiling fan blades.

6. A switch housing remote control system for ceiling fans, comprising:

a ceiling fan motor with ceiling fan blades and a receiver;

an existing first capacitor integrated with the ceiling fan motor and the receiver for controlling operating speeds for the ceiling fan motor;

a first mechanical switch for turning power on and off to the existing first capacitor for controlling operating speeds for the ceiling fan motor;

at least one light attached to the ceiling fan motor;

an existing second capacitor integrated with the at least one light for activating the at least one light;

a second mechanical switch for turning power on and off to the existing second capacitor;

a remote control transmitter for remotely turning power on and off to the first mechanical switch operating the ceiling fan motor;

a remote switch housing receiver which houses the receiver in the ceiling fan for receiving wireless signal transmissions from the remote control transmitter for turning power on and off to the existing first capacitor for controlling operating speeds for the ceiling fan motor, and for turning power on and off to the existing second capacitor for activating the at least one light, wherein the remote switch housing receiver solely uses the existing first capacitor and the existing second capacitor without using any additional capacitors, and wherein the remote control transmitter further remotely activates the at least one light by turning power on an off to the existing second capacitor;

the remote switch housing receiver is mounted in a fan switch box housing on which both the first mechanical switch and the second mechanical switch is attached, wherein the remote switch housing receiver is a replaceable receiver having a size up to approximately 2 inches by approximately 1.5 inches by approximately 1 inch; and a circuit inside the ceiling fan which controls fan speeds, and an antenna to communicate with the transmitter, and wherein a control unit translates incoming signals from the transmitter and directs outgoing commands to a printed circuit board, and a memory chip that maintains signal pairing to the transmitter and last settings of the fan and the light.

7. A switch housing remote control system for ceiling fans, comprising:

a ceiling fan motor with ceiling fan blades and a receiver;

an existing first capacitor integrated with the ceiling fan motor and the receiver for controlling operating speeds for the ceiling fan motor;

a first mechanical switch for turning power on and off to the existing first capacitor for controlling operating speeds for the ceiling fan motor;

at least one light attached to the ceiling fan motor;

an existing second capacitor integrated with the at least one light for activating the at least one light;

a second mechanical switch for turning power on and off to the existing second capacitor;

a remote control transmitter for remotely turning power on and off to the first mechanical switch operating the ceiling fan motor;

a remote switch housing receiver which houses the receiver in the ceiling fan for receiving wireless signal transmissions from the remote control transmitter for turning power on and off to the existing first capacitor for controlling operating speeds for the ceiling fan motor, and for turning power on and off to the existing second capacitor for activating the at least one light, wherein the remote switch housing receiver solely uses the existing first capacitor and the existing second capacitor without using any additional capacitors, and wherein the remote control transmitter further remotely activates the at least one light by turning power on an off to the existing second capacitor;

the remote switch housing receiver is mounted in a fan switch box housing, wherein the remote switch housing receiver is a replaceable receiver having a size up to approximately 2 inches by approximately 1.5 inches by approximately 1 inch; and a circuit inside the ceiling fan which controls fan speeds, and an antenna to communicate with the transmitter, and wherein a control unit translates incoming signals from the transmitter and directs outgoing commands to a printed circuit board, and a memory chip that maintains signal pairing to the transmitter and last settings of the fan and the light.

* * * * *